H. G. VOIGHT.
MEAT HOOK OR THE LIKE.
APPLICATION FILED DEC. 5, 1918.

1,316,209.

Patented Sept. 16, 1919.

INVENTOR
Henry G. Voight
BY
Henry E. Rockwell
ATTORNEY

UNITED STATES PATENT OFFICE.

HENRY G. VOIGHT, OF NEW BRITAIN, CONNECTICUT, ASSIGNOR TO SARGENT & COMPANY, OF NEW HAVEN, CONNECTICUT, A CORPORATION OF CONNECTICUT.

MEAT-HOOK OR THE LIKE.

1,316,209. Specification of Letters Patent. Patented Sept. 16, 1919.

Application filed December 5, 1918. Serial No. 265,372.

*To all whom it may concern:*

Be it known that I, HENRY G. VOIGHT, a citizen of the United States, residing in New Britain, county of Hartford, and State of Connecticut, have invented certain new and useful Improvements in Meat-Hooks or the like, of which the following is a full, clear, and exact description.

This invention relates to means for preventing one relatively movable member from being accidently disengaged from another member, and more particularly it relates to a gripping means for preventing a meat hook or the like from being accidentally disengaged from the supporting rail or bracket upon which it is removably mounted.

Meat shops and meat store-rooms are commonly provided with horizontally extending supporting rails or brackets upon which a number of meat hooks are removably mounted. These hooks usually are not rigidly secured to the supporting rail, but are provided with a U-shaped portion which engages the upper edge and the front and rear faces of the supporting rail in order that the meat hook may be readily adjusted back and forth along the same or removed therefrom if desired. One objectionable feature of this type of meat hook is that when it is attempted to disengage a portion of meat from the same, the hook is often lifted up and entirely removed from its supporting rail, and sometimes the hook, upon being removed from its rail in this manner, becomes disengaged from the piece of meat which it has been supporting and falls upon the person handling the meat, and injures him, as the meat hook is fairly heavy and is provided with a sharp point.

The principal object of my invention is to provide a meat hook or the like with simple, but efficient means for preventing the same from being accidentally disengaged from its supporting bracket, although it will be apparent that the gripping means, herein disclosed, is not necessarily limited in its application to a meat hook, since this gripping means is well adapted to prevent any type of support means provided with a U-shaped rail engaging portion from being accidentally disengaged from its supporting rail.

Another object of my invention is to provide a meat hook with gripping means for securing the same to its supporting rail in which the construction and location of the gripping element is such that the likelihood of dirt and the like accumulating upon and about the gripping element is reduced to a minimum.

To these and other ends the invention consists in the novel features and combinations of parts to be hereinafter described and claimed.

Figure 1:
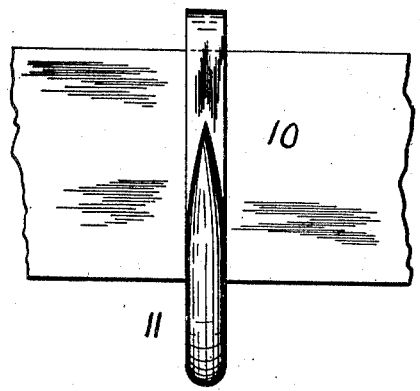
Figure 1 is a front elevation of a portion of a supporting rail, having a meat hook mounted upon the same.

In the drawing I have designated by the numeral 10 a portion of a supporting rail upon which meat hooks, such as 11, are commonly mounted. This type of meat hook which is now in general use, is commonly provided with a curved hooked portion 12 having a pointed end 13, sufficiently sharp to be readily forced into a portion of meat to be hung upon the same. The meat hook 11 is further commonly provided with a U-shaped portion 14, which is adapted to engage the upper edge of the supporting rail 10 and the front and rear faces of the same, as above stated. This construction for supporting a meat hook upon its supporting rail permits the same to be moved back and forth along the rail, as may be desired, and to be readily removed from and applied to the supporting rail. In order to prevent this meat hook 11 from being accidentally disengaged from its supporting rail 10, in the manner above set forth, when it is attempted to disengage a portion of meat from the hook, I have provided the hook 11 with a gripping means, hereinafter more fully described, for gripping the rail 10.

Figure 3:
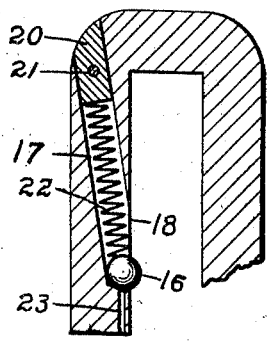
Fig. 3 is an enlarged sectional view of a portion of my improved meat hook, shown disengaged from its supporting rail.

This gripping means is preferably mounted in the rear leg 15 of the U-shaped portion 14, and consists of a ball 16, which is slidably mounted in a drill hole 17, extending lengthwise of the rear U-shaped leg in an inclined direction. This drill hole 17 preferably extends from the upper outer face of the leg 15 downwardly in an inclined direction, so that it partially cuts through the inner face of the leg 15, as at 18, and terminates a short distance from the lower end of the leg 15, as at 19. The portion of the inner wall of the leg 15, which is cut away by the drill hole 17, is sufficiently large to permit the ball 16 to partially project therethrough, as shown in Fig. 3, but is not large enough to permit this ball to entirely escape from the drill hole 17. In order to prevent the ball 16 from being lost out of the drill hole 17, a plug, such as 20, is preferably mounted in the upper end of this drill hole, and if desired, may be secured therein by a small pin, such as 21. In order that the ball 16 may more readily grip the rear face of the supporting rails 10, I preferably provide a coiled spring 22, which is mounted in the drill hole 17, one end of which spring rests upon the ball 16, and the other end abuts against the plug 20.

Figure 2:
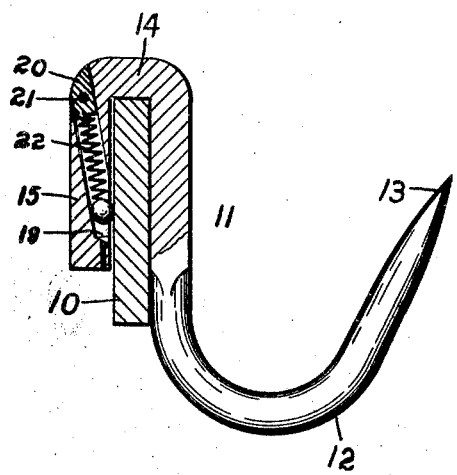
Fig. 2 is a sectional view through the meat hook and supporting rail disclosed in Fig. 1, the meat hook being provided with my novel rail gripping means.

From the above description, when read in connection with the drawing, it will be apparent that when the U-shaped portion 14 of my meat hook is applied to the supporting rail 10, the portion of the ball 16 which protrudes out of the opening 18 will contact with the rear face of the member 10 and will thereby be forced upwardly in the drill hole 17 and away from the rear face of the rail, as shown in Fig. 2, whereby the meat hook 11 may readily be moved into position upon the rail 10, but should force be exerted upon the meat hook, tending to disengage the same from its supporting rail, by raising the hook relatively to its rail, this force would cause the ball 16 to move downwardly within the inclined drill hole and thereby force the ball into gripping engagement with the rail 10 and prevent the hook 11 from being removed from its supporting rail in a very satisfactory manner. In order that the gripping means, just described, may be rendered inactive to permit the hook 11 to be moved from its supporting rail, I have formed a small drill hole 23 in the lower end of the leg 15 through which a piece of wire or the like may be inserted to raise the ball 16 sufficiently to move the same out of gripping engagement with the rail 10, whereupon the meat hook may be readily removed from its supporting rail. It should be noted that by mounting the rail gripping means in the rear leg 15 of the meat hook in the manner herein set forth so that it engages the rear face of the rail 10, the likelihood of dirt and grease lodging about the gripping means is reduced to a minimum.

Figure 4:
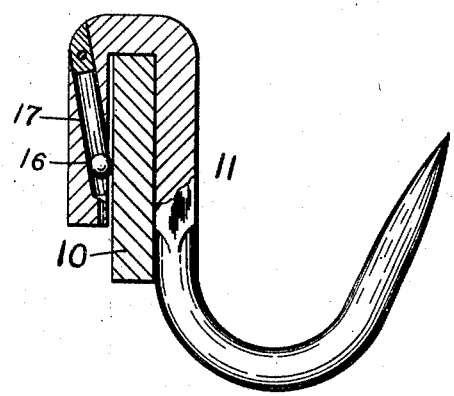
Fig. 4 is a slight modification of the meat hook, shown in Fig. 2.

Since the construction of my gripping means is such that the weight of the ball 16 will normally cause the same to move downwardly into gripping position, the coiled spring 22 is not an essential feature of my invention, for gravity alone will cause the ball to move into gripping engagement with the rail 10 in a very satisfactory manner. I have, therefore, illustrated in Fig. 4 of the drawing, a modification of my invention in which the spring 22 has been omitted. The structure disclosed in this figure is otherwise similar to that shown in Fig. 2 of the drawing and the operation is the same.

The rail gripping means herein disclosed prevents the meat hook from being accidentally disengaged from its supporting rail in a very satisfactory manner, but this gripping means does not materially interfere with the shifting of the meat hook along the supporting rail 10 in a longitudinal direction.

While I have described my gripping means as applied to a meat hook, it will be apparent that the gripping means herein disclosed may be used in connection with various devices to prevent the same from being accidentally disengaged from its support.

I have not attempted to describe the modifications of the construction which may be adopted without departing from the scope of the invention, as defined in the annexed claims.

What I claim is:

1. In a meat hook or the like, means formed upon the same for engaging a support, said means having a U-shaped construction for contacting with the opposite faces of said support, and a gripping device slidably mounted within one of the legs of said U-shaped portion to automatically grip said support and thereby prevent the meat hook or the like from being accidentally disengaged from its support.

2. In combination with a supporting rail, a supporting member slidably mounted upon the upper face of said rail and movable laterally of said rail into and out of engagement with the same, and rail gripping means carried by said member, comprising a ball movably mounted in a wall of said member and positioned to automatically grip said rail to prevent said member from being accidentally disengaged therefrom.

3. In a meat hook or the like having a U-shaped portion for engaging a supporting bracket, means upon the same for automatically engaging said bracket to prevent said meat hook or the like from being accidentally disengaged therefrom, said means comprising a gripping member rotatably and slidably mounted in the bracket engaging portion of said meat hook or the like.

4. In combination with a horizontal supporting rail, a rail engaging member removably mounted upon said rail and constructed to loosely engage the front and rear faces of the same, and means carried by said member for automatically gripping the rear face of said rail to prevent said member from being accidentally disengaged from said rail.

5. In combination with a supporting bracket or rail, a supporting member removably mounted thereupon, and constructed to embrace said bracket or rail, means to prevent said member from being accidentally disengaged from said bracket, comprising a ball slidably mounted in a portion of said supporting member, and a spring normally holding said ball in gripping engagement with said bracket.

6. In combination with a supporting bracket, a meat hook or the like having a U-shaped portion for embracing said bracket, one of the legs of said U-shaped portion having an inclined passage formed therein, and gripping means slidably mounted within said passage and constructed to be forced by the inclination of said passage into gripping engagement with said bracket.

In witness whereof I have hereunto set my hand on the 29th day of November, 1918.

HENRY G. VOIGHT.

Copies of this patent may be obtained for five cents each, by addressing the "Commissioner of Patents, Washington, D. C."